(12) United States Patent
Zhang

(10) Patent No.: US 10,566,814 B2
(45) Date of Patent: Feb. 18, 2020

(54) CHARGING CONTROL METHOD, DEVICE, AND POWER ADAPTER

(71) Applicant: Guangdong Oppo Mobile Telecommunications Corp., Ltd., Dongguan, Guangdong (CN)

(72) Inventor: Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 299 days.

(21) Appl. No.: 15/371,383

(22) Filed: Dec. 7, 2016

(65) Prior Publication Data
US 2017/0085099 A1    Mar. 23, 2017

Related U.S. Application Data

(63) Continuation of application No. PCT/CN2015/075295, filed on Mar. 27, 2015.

(51) Int. Cl.
*H02J 7/00* (2006.01)
*H01M 10/44* (2006.01)
*H02J 7/04* (2006.01)

(52) U.S. Cl.
CPC ............ *H02J 7/007* (2013.01); *H01M 10/44* (2013.01); *H02J 7/0029* (2013.01);
(Continued)

(58) Field of Classification Search
CPC ........ H02J 7/007; H02J 7/0029; H02J 7/0045; H02J 7/0047; H02J 7/0091; H02J 7/047; H01M 10/44
(Continued)

(56) References Cited

U.S. PATENT DOCUMENTS

| 7,907,062 B2 | 3/2011 | Feliss et al. |
| 8,981,731 B1 | 3/2015 | Oku |

(Continued)

FOREIGN PATENT DOCUMENTS

| CN | 102196942 A | 9/2011 |
| CN | 102651526 A | 8/2012 |
| CN | 203445596 U | 2/2014 |

OTHER PUBLICATIONS

Extended European search report issued in corresponding European application No. 15886806.7 dated Oct. 24, 2017.

*Primary Examiner* — Zixuan Zhou
(74) *Attorney, Agent, or Firm* — Young Basile Hanlon & MacFarlane, P.C.

(57) ABSTRACT

The present disclosure provides a charging control method, a charging control device, and a power adapter. The charging control method can be performed in a power adapter configured to charge an electronic equipment through a charging cable, and includes: determining temperature of a charging interface, and controlling charging for the electronic equipment according to the temperature of the charging interface, wherein the charging interface includes at least one of the following interfaces: an interface of the power adapter used for electrical connection with the charging cable, an interface of the charging cable used for electrical connection with the power adapter, an interface of the charging cable used for electrical connection with the electronic equipment; and an interface of the electronic equipment used for electrical connection with the charging cable.

10 Claims, 11 Drawing Sheets

(52) U.S. Cl.
CPC .......... *H02J 7/0045* (2013.01); *H02J 7/0047* (2013.01); *H02J 7/0091* (2013.01); *H02J 7/047* (2013.01); *H02J 2007/0039* (2013.01)

(58) Field of Classification Search
USPC ........................................ 320/107, 144, 153
See application file for complete search history.

(56) References Cited

U.S. PATENT DOCUMENTS

| | | |
|---|---|---|
| 2009/0195237 A1 | 8/2009 | Feliss et al. |
| 2011/0204849 A1 | 8/2011 | Mukai et al. |
| 2012/0212179 A1 | 8/2012 | Nathan |
| 2015/0123616 A1* | 5/2015 | Oku ........................ H02J 7/027 320/114 |
| 2015/0180221 A1* | 6/2015 | Leinonen ................ H02H 5/04 361/103 |

* cited by examiner

CHARGING CONTROL METHOD, DEVICE, AND POWER ADAPTER

CROSS-REFERENCE TO RELATED APPLICATION

This application is a continuation of International Application No. PCT/CN2015/075295, entitled "CHARGE CONTROL METHOD AND APPARATUS, AND POWER ADAPTER", filed on Mar. 27, 2015, which disclosure is herein incorporated by reference.

TECHNICAL FIELD

The present disclosure relates to charging technology, and particularly to a charging control method, a charging control device, and a power adapter.

BACKGROUND

Electronic equipments such as mobile phones are usually equipped with a rechargeable battery that can be charged through a power adapter.

Upon charging, the power adapter converts alternating current (AC) to direct current (DC) with specified voltage and supplies DC to electronic equipments. In the power adapter and the electronic equipment, an electronic interface is typically provided respectively. Electrical connection with a charging cable can be achieved through the electronic interface, whereby the electronic equipment can be charged through the charging cable.

Electrical connection between electronic interfaces is achieved via contact of a metal contact sheet. Because of thermal effects of resistance, heat is generated at the metal contact sheet when charging current flows through. Large charging current or high charging voltage may cause high temperature of the electronic interface; in such a condition, device damage or even an explosion may occur, which can affect the security of charging.

SUMMARY

Disclosed herein are implementations of a method for charging control, performed in a power adapter configured to charge an electronic equipment through a charging cable, comprising determining temperature of a charging interface, and controlling charging for the electronic equipment according to the temperature of the charging interface, wherein the charging interface comprising at least one of: an interface of the power adapter used for electrical connection with the charging cable, an interface of the charging cable used for electrical connection with the power adapter, an interface of the charging cable used for electrical connection with the electronic equipment, and an interface of the electronic equipment used for electrical connection with the charging cable.

Disclosed herein are also implementations of a device for charging control, deployed in a power adapter used for charging of an electronic equipment through a charging cable, comprising a determining unit, configured to determine temperature of a charging interface, and a controlling unit, configured to control charging for the electronic equipment according to the temperature of the charging interface, the charging interface comprising at least one of: an interface of the power adapter used for electrical connection with the charging cable, an interface of the charging cable used for electrical connection with the power adapter, an interface of the charging cable used for electrical connection with the electronic equipment, and an interface of the electronic equipment used for electrical connection with the charging cable.

Disclosed herein are also implementations of a power adapter, comprising an adapter main body, configured to obtain alternating current from a power supply and convert the alternating current to direct current with specified voltage, an interface, configured to electronically connect to a charging cable, obtain the direct current from the adapter main body, and provide the direct current to an electronic equipment through the charging cable, and a processor, configured to determine temperature of a charging interface, and control the adapter main body or the interface of the power adapter according to the temperature of the charging interface to control the direct current provided to the electronic equipment, the charging interface comprising at least one of: the interface of the power adapter, an interface of the charging cable used for electrical connection with the power adapter, an interface of the charging cable used for electrical connection with the electronic equipment, and an interface of the electronic equipment used for electrical connection with the charging cable.

BRIEF DESCRIPTION OF THE DRAWINGS

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

DETAILED DESCRIPTION

The technical solutions of the implementations of the present disclosure will be described clearly and completely taken in conjunction with the accompanying drawings; it will be apparent to one of ordinary skill in the art that, the implementations described below are merely a part of the disclosure and other implementations obtained out of them without creative work will fall into the protection range of the present disclosure either.

Implementation 1

Figure 1:
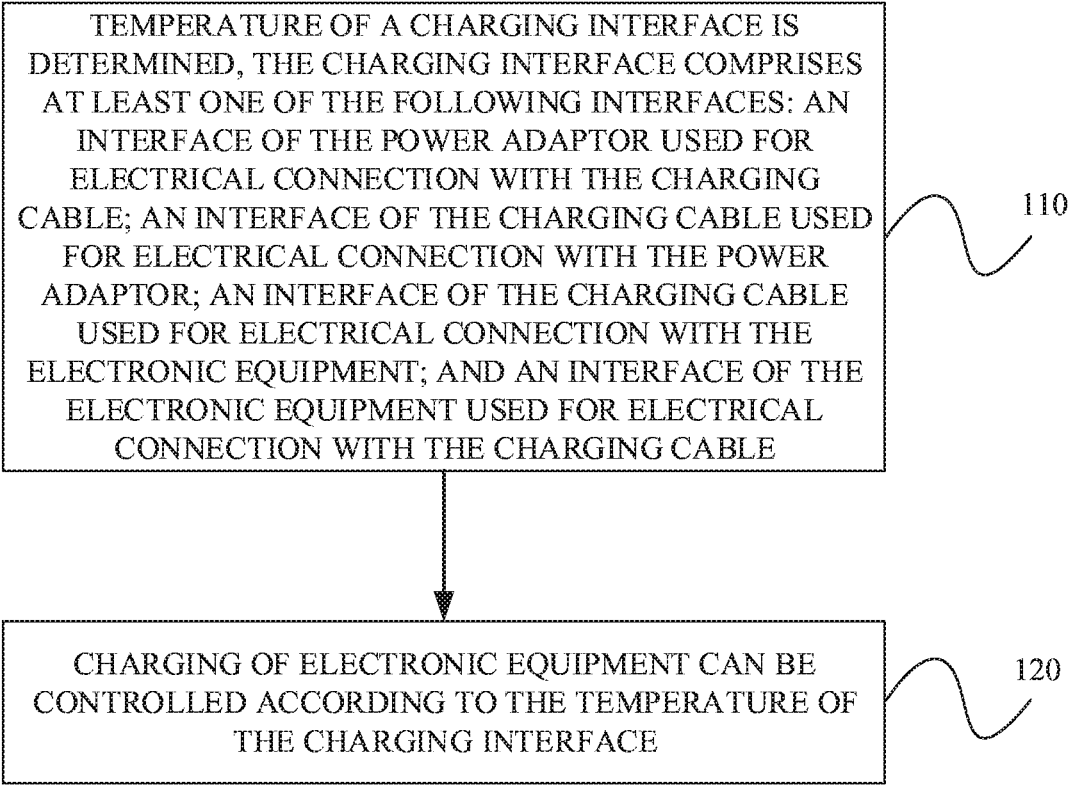
FIG. 1 is a schematic flow chart illustrating a charging control method according to an implementation of the present disclosure.

According to implementation 1 of the present disclosure, it is provided a charging control method. FIG. 1 is a schematic flow chart illustrating the method. The method can be performed in a power adapter configured to charge an electronic equipment through a charging cable; that is to say, the method can be performed by the power adapter. As shown in FIG. 1, the method begins at block 110.

Specifically, at block 110, temperature of a charging interface is determined; at block 120, charging of the electronic equipment can be controlled according to the temperature of the charging interface.

The method can be applied to a charging system in which charging can be achieved through electrical connection via a charging interface.

The charging interface, which can include but is not limited to at least one of the following interfaces, will be described in detail.

Interface A: an interface of the power adapter used for electrical connection with the charging cable.

Interface B: an interface of the charging cable used for electrical connection with the power adapter (to be specific, Interface A).

Interface C: an interface of the charging cable used for electrical connection with the electronic equipment.

Interface D: an interface of the electronic equipment used for electrical connection with the charging cable (to be specific, Interface C).

As one example, in the charging system, the power adapter, the charging cable, and the electronic equipment (such as mobile phone) can be independent of one another. In this circumstance, the charging interface can include all interfaces illustrated above, that is, Interface A, Interface B, Interface C, and Interface D.

As another example, in the charging system, the charging cable and the electronic equipment can be set integrally. In this circumstance, the charging interface can include Interface A and Interface B.

As still another example, in the charging system, the power adapter and the charging cable can be set integrally. In this circumstance, the charging interface can include Interface C and Interface D.

Consequently, in the charging control method according to the present disclosure, at block 110, the power adapter can determine temperature of at least one interface of Interface A~Interface D. Operations for determining the temperature of each interface will be described in detail below.

Operations for Determining Temperature of Interface A

The charging interface includes Interface A, that is, an interface of the power adapter used for electrical connection with the charging cable.

In Interface A, there is at least one temperature measuring component (marked as temperature measuring component A or first temperature measuring component) configured to measure temperature of Interface A. Based on this, the process of determining the temperature of the charging interface at block 110 can be detailed as follows: the temperature of the charging interface is determined through temperature measuring component A arranged in Interface A.

Therefore, the power adapter can measure the temperature of Interface A through temperature measuring component A.

Example 1

In example 1, the process of determining the temperature of the charging interface can be specified as: temperature of at least one contact sheet arranged in Interface A can be measured by the power adapter through at least one temperature measuring component A; and the temperature of the charging interface can be determined according to the temperature of the at least one contact sheet. The at least one temperature measuring component A corresponds to the at least one contact sheet separately; and the contact sheet is used to transfer charging current.

Figure 2:
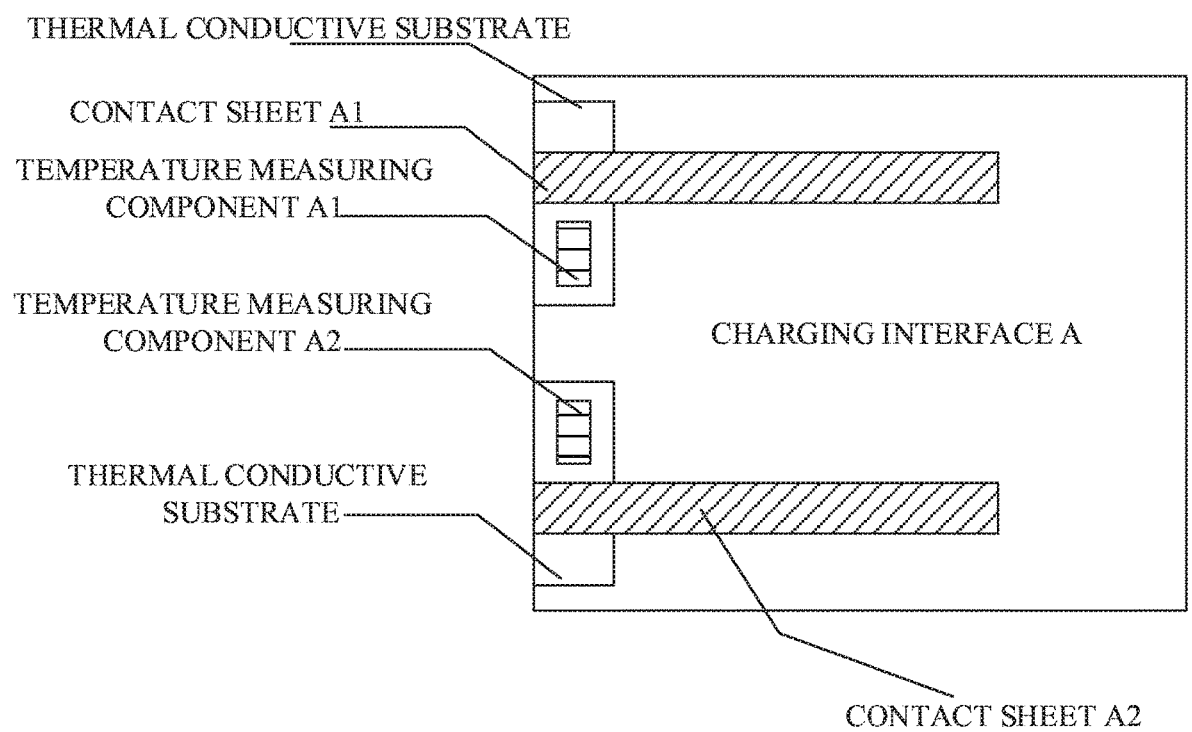
FIG. 2 is a schematic diagram illustrating the configuration relationship between temperature measuring components and an electronic interface.

FIG. 2 is a schematic diagram illustrating the configuration relationship between temperature measuring components and an electronic interface. As shown in FIG. 2, a plurality of metal contact sheets can be arranged in Interface A (for example, in the tab of Interface A). Although not shown in the figure, similarly, a plurality of metal contact sheets can be arranged in Interface B (for example, in the tab of Interface B). Typically, a plurality of metal contact sheets in Interface A correspond to a plurality of metal contact sheets in Interface B separately, for example, corresponding in position. When Interface A is connected with Interface B, each contact sheet in Interface A and a corresponding contact sheet in Interface B will contact with each other; thus electrical connection between the power adapter and the charging cable can be achieved.

Since the contact sheet is a thermal source, temperature of the contact sheet in Interface A can be measured via temperature measuring component A. The temperature of Interface A can be determined based on the temperature of the contact sheet.

Temperature sensor to be used as temperature measuring component A can be chosen according to configuration space and the like of Interface A. For example, temperature measuring component A can be a thermistor.

As illustrated above, there can be one or more temperature measuring component A in Interface A. In order to ensure the accuracy of measurement, one temperature measuring component A corresponds to one contact sheet only; in other words, one temperature measuring component A is configured to measure temperature of one contact sheet only. As one example, there are at least two temperature measuring components, which correspond to at least two contact sheets in Interface A separately.

Specifically, according to the implementation of the present disclosure, the number of temperature measuring component A can be determined according to the number of contact sheets in Interface A, for example, these two numbers can be equal. Therefore, each temperature measuring component can measure temperature of a corresponding contact sheet thereof respectively, whereby temperatures of all contact sheets in Interface A can be obtained.

For example, as shown in FIG. 2, in Interface A, there are two contact sheets for transmitting current, that is, contact sheet A1 and contact sheet A2. Two temperature measuring components, that is, temperature measuring component A1 and temperature measuring component A2, are provided correspondingly. Temperature measuring component A1 corresponds to contact sheet A1 and is used to measure temperature of contact sheet A1. Temperature measuring component A2 corresponds to contact sheet A2 and is used to measure temperature of contact sheet A2.

Configuration relationship between temperature measuring component A and the contact sheet in Interface A will be described in detail below. If more than one temperature measuring component A is provided, the configuration manner between each temperature measuring component and a corresponding contact sheet thereof can be the same or similar. The configuration manner between temperature measuring component A1 and contact sheet A1 as illustrated in FIG. 2 will be described below as an example.

As one implementation, temperature measuring component A1 can be laminated to the surface of contact sheet A1. Alternatively, as shown in FIG. 2, temperature measuring component A1 and contact sheet A1 can be arranged on the same thermal conductive substrate, therefore, heat of contact sheet A1 can be conducted to temperature measuring component A1 via the thermal conductive substrate, and there is a preset interval $\alpha$ between the temperature measuring component A1 and the contact sheet A1. Wherein the size of interval $\alpha$ can be adjusted according to the size and configuration of Interface A. Therefore, with the aid of interval $\alpha$, influence of the current flowing through contact sheet A1 on temperature measuring component A1 caused by direct contact can be avoided.

As to the thermal conductive substrate, in order to improve the thermal conductivity thereof, it can be metallic; that is to say, it can be made of metal materials such as copper foil, aluminum foil, or the like. Furthermore, the thickness of the thermal conductive substrate can be set as small as possible so as to further improve the thermal conductivity.

In addition, there can be an insulating thermal conductive layer between temperature measuring component A and the thermal conductive substrate; or, the insulating thermal conductive layer can be arranged between a corresponding contact sheet of temperature measuring component A and the thermal conductive substrate.

More specifically, upon charging for the electronic equipment, current will flow through contact sheet A1 of Interface A illustrated in FIG. 2. Thus, when adopting a metallic thermal conductive substrate, current can flow through the thermal conductive substrate from contact sheet A1 to temperature measuring component A1. When adopting an electronic component such as a thermistor or an electronic temperature sensor as temperature measuring component A1, current flowing through the thermal conductive substrate from contact sheet A1 may affect temperature measuring component A1. By arranging an insulation layer between temperature measuring component A1 and the thermal conductive substrate, or, by arranging the insulation layer between contact sheet A1 and the thermal conductive substrate, effects of external current on temperature measuring component A1 can be avoided while conducting heat, and the safety and reliability of battery components of the present disclosure can be improved.

It should be understood, the material and shape of the thermal conductive substrate described above is only illustrative explanation, the present disclosure is not limited thereto; any type of thermal conductive substrate is possible as long as heat can be transmitted to the temperature measuring component via the contact sheet. For example, the thermal conductive substrate can be a printed circuit board (PCB) with a thermal conductive layer paved on the surface thereof.

Example 2

In example 2, the process of determining the temperature of the charging interface can be specified as: use the first temperature measuring component, that is, temperature measuring component A, to measure temperature of a corresponding contact sheet in at least two time period so as to obtain at least two temperature values; the at least two temperature values correspond to the at least two time period respectively; then the at least two temperature values are averaged so as to determine the temperature of the charging interface.

Specifically, each temperature measuring component (for ease of understanding, take temperature measuring component A1 as an example) can perform multiple measurements (that is, in at least two time point) on the temperature of contact sheet A1 in one period of temperature measurement. Thus, multiple temperature values of contact sheet A1 at different time points can be determined. The multiple temperature values referred to here can be the same or different, there is no restriction on this. Thereafter, the multiple temperature values will be averaged, such as calculating the arithmetic mean thereof; the mean value thus obtained will be deemed as the temperature of contact sheet A1.

Operations for determining the temperature of the contact sheet of interface A described above is for illustrative explanation only, and the present disclosure is not limited thereto. For example, only one piece of temperature information transmitted by temperature measuring component A is required to be obtained, and the unique temperature value thus obtained will be the temperature of the contact sheet of interface A. As another implementation, the maximum temperature value among multiple temperature information transmitted by temperature measuring component A will be the temperature of the contact sheet of interface A.

Example 3

In example 3, the process of determining the temperature of the charging interface can be specified as: use at least two temperature measuring components (that is, temperature measuring A) to obtain at least two temperature values; the at least two temperature values are averaged so as to determine the temperature of the charging interface, wherein the at least two temperature measuring components correspond to the at least two temperature values respectively.

Specifically, in this example, a plurality of temperature measuring components is arranged, and temperature values of contact sheets measured by each corresponding temperature measuring component respectively can be averaged. The mean temperature obtained will be the temperature of the contact sheet of the charging interface.

In the examples described above, instead of using the temperature of the contact sheet as the temperature of Interface A directly, the temperature of the contact sheet can be processed properly in order to obtain the temperature of Interface A. For example, a preset value can be subtracted from the temperature of the contact sheet, and the temperature after subtraction will be the temperature of Interface A. Any method being used to obtain the temperature of the charging interface based on the temperature of the contact sheet shall fall into the scope of protection of the present disclosure.

In addition, the configuration and measurement object of temperature measuring component A is illustrative explanation only, and the present disclosure is not limited thereto. For example, temperature measuring component A can be arranged on the case of Interface A so as to measure the temperature thereof; the temperature of the case will be the temperature of Interface A.

Operations for Determining Temperature of Interface B

The charging interface includes Interface B, that is, an interface of the charging cable used for electrical connection with the power adapter.

The process of determining the temperature of the charging interface includes: first temperature indicating information is received from the charging cable, wherein the first temperature indicating information is used to indicate the temperature of the charging interface measured by a second temperature measuring component arranged in Interface B; and the temperature of the charging interface is determined according to the first temperature indicating information.

As can be seen from the above description, at least one temperature measuring component (that is, the second temperature measuring component) for measuring temperature of Interface B is arranged in the charging cable. In order to facilitate description, in the following, the second temperature measuring component will be represented as temperature measuring component B.

Thus, the temperature of Interface B can be measured by the charging cable via temperature measuring component B. Thereafter, the charging cable can transmit the first temperature indicating information used to indicate the temperature of Interface B to the power adapter; and then the power adapter can determine the temperature of Interface B according to the first temperature indicating information.

In this implementation, the configuration and measurement object of temperature measuring component B in Interface B is similar to that of temperature measuring component A in Interface A, detailed description will be omitted to avoid redundancy.

Operations for Determining Temperature of Interface C

The charging interface includes Interface C, that is, an interface of the charging cable used for electrical connection with the electronic equipment.

The process of determining the temperature of the charging cable includes: second temperature indicating information used to indicate the temperature of the charging interface measured through a third temperature measuring component arranged in Interface C is received from the charging cable. Then the temperature of the charging interface can be determined according to the second temperature indicating information.

As can be seen from the above description, at least one temperature measuring component (that is, the third temperature measuring component) for measuring temperature of Interface C is arranged in the charging cable. In order to facilitate description, in the following, the third temperature measuring component will be represented as temperature measuring component C.

Thus, the temperature of Interface C can be measured by the charging cable via temperature measuring component C. Thereafter, the charging cable can transmit the second temperature indicating information used to indicate the temperature of Interface C to the power adapter; and then the power adapter can determine the temperature of Interface C according to the second temperature indicating information.

In this implementation, the configuration and measurement object of temperature measuring component C in Interface C is similar to that of temperature measuring component A in Interface A, detailed description will be omitted to avoid redundancy.

Operations for Determining Temperature of Interface D

The charging interface includes Interface D, that is, an interface of the electronic equipment used for electrical connection with the charging cable.

The process of determining the temperature of the charging interface includes: third temperature indicating information used to indicate the temperature of the charging interface measured by a fourth temperature measuring component arranged in Interface D is received from the electronic equipment via the charging cable; and the temperature of the charging interface is determined according to the third temperature indicating information.

As can be seen from the above description, at least one temperature measuring component (that is, the fourth temperature measuring component) for measuring temperature of Interface D is arranged in the electronic equipment. In order to facilitate description, in the following, the fourth temperature measuring component will be represented as temperature measuring component D.

Thus, the temperature of Interface D can be measured by the electronic equipment via temperature measuring component D. Thereafter, the electronic equipment can transmit the third temperature indicating information used to indicate the temperature of Interface D to the power adapter via the charging cable; and then the power adapter can determine the temperature of Interface D according to the third temperature indicating information.

In this implementation, the configuration and measurement object of temperature measuring component D in Interface D is similar to that of temperature measuring component A in Interface A, detailed description will be omitted to avoid redundancy.

To be concluded, by means of the technical schemes described above, the power adapter can determine the temperature of at least one interface among Interface A~Interface D at block 110, and then at block 120, charging control is performed according to the temperature determined at block 110, which will be described in detail below.

Charging Control

Operations for charging control performed at block 120 can be specified as follows: the current value or voltage value of charging current will be decreased if the temperature of the charging interface is greater than or equal to a first temperature threshold; or, the charging current will be forbidden to be output if the temperature of the charging interface is greater than or equal to a second temperature threshold; wherein the second temperature threshold is greater than the first temperature threshold.

In the following, the temperature based on which charging control is performed will be expressed as "charging interface temperature". As described above, it can be the temperature of any of Interface A~Interface D; or, can be the maximum temperature, the minimum temperature, or the average temperature of multiple temperatures corresponding to multiple interfaces among Interface A~Interface D.

Specifically, if the charging interface temperature is greater than or equal to the first temperature threshold, it is indicated that there are security risks in charging system; the power adapter can decrease charging current or charging voltage so as to reduce the quantity of heat generated by the charging interface. The first temperature threshold can be a safe temperature threshold for fast-charging (for example, high current charging or high voltage charging), for example, it can be arbitrary temperature in the range of 15° C.~45° C.

Furthermore, if the charging interface temperature is greater than or equal to the second temperature threshold which is greater than the first temperature threshold, it is indicated that the charging system is no longer suitable to continue working; the power adapter can cut off the charging circuit. The second temperature threshold can be a safe temperature threshold for charging, for example, it can be 50° C.

Specific numerical examples are given to illustrate the temperature thresholds; the present disclosure is not limited thereto. Each temperature threshold can be determined according to a safe working temperature and/or maximum permissible temperature of various components (such as the power adapter, the charging cable, and the electronic equipment) of the charging system; or, can be determined according to values (for example, numerical values set according to degree of tolerance to heat) preset by the user.

In the above description, charging control according to charging interface temperature is performed by the power adapter. The present disclosure is not limited thereto. In the circumstance where the charging cable or the electronic equipment has charging control function, the power adapter can transmit information indicating the temperature of Interface A to the charging cable or the electronic equipment. Charging control can be performed by the charging cable or the electronic equipment according to the information. The method and process of the charging cable or the electronic equipment is similar to that of the power adapter. Details will be omitted to avoid redundancy.

Wherein Interface A~Interface D referred to in the present disclosure can be achieved by existing USB interface; information transmission among the power adapter, the charging cable, and the electronic equipment can be performed via data transmission circuits in the USB interface.

The charging control method according to the implementation of the present disclosure has been described with refer to FIG. 1 and FIG. 2. By means of the method, the temperature of the charging interface can be determined, and charging control can be performed according to the temperature of the charging interface, whereby components can be protected by adjusting charging current or charging voltage or even cutting off charging circuit, and safety of charging can be improved.

Implementation 2

Figure 3A:
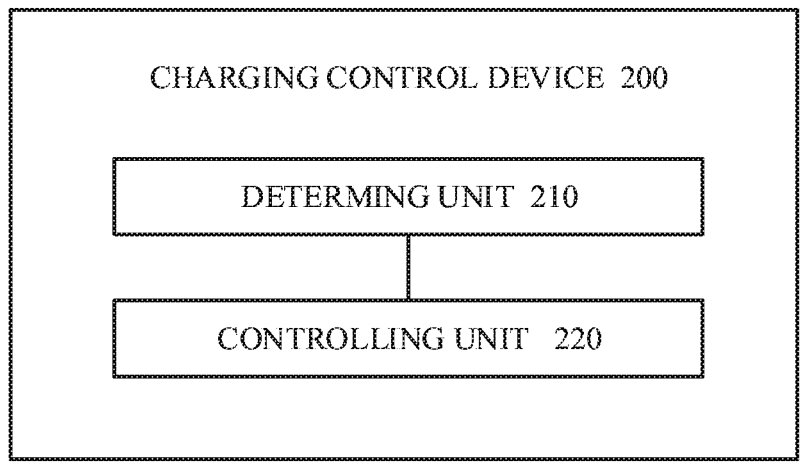
FIG. 3A is a schematic structure diagram illustrating a charging control device according to an implementation of the present disclosure.

According to Implementation 2 of the present disclosure, it is provided a charging control device, and FIG. 3A is a schematic structure diagram illustrating the device. As shown in FIG. 3A, a charging control device 200, which is deployed in a power adapter used for charging of an electronic equipment through a charging cable, includes a determining unit 210 and a controlling unit 220. In practice, the determining unit 210 can be a processor, and the controlling unit 220 can be a controller connected with the processor.

The determining unit 210 is configured to determine temperature of a charging interface; the controlling unit 220 is configured to control charging for the electronic equipment according to the temperature of the charging interface. Wherein the charging interface includes at least one of the following interfaces: an interface of the power adapter used for electrical connection with the charging cable; an interface of the charging cable used for electrical connection with the power adapter; an interface of the charging cable used for electrical connection with the electronic equipment; and an interface of the electronic equipment used for electrical connection with the charging cable.

Example 1

The charging interface includes the interface of the power adapter used for electrical connection with the charging cable.

Figure 3B:
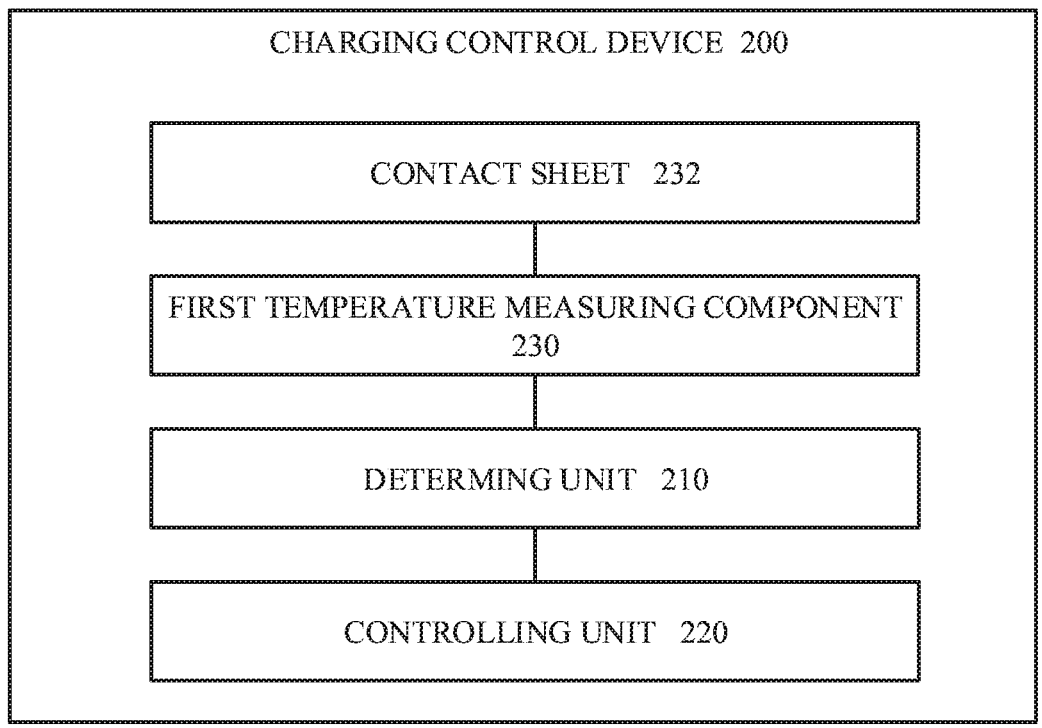
FIGS. 3B-3E are detailed schematic structure diagrams illustrating the charging control device according to implementations of the present disclosure.

As shown in FIG. 3B, the charging control device further includes at least one first temperature measuring component 230 arranged in the interface of the power adapter used for electrical connection with the charging cable, and the determining unit 210 is configured to determine the temperature of the charging interface through the at least one first temperature measuring component.

Furthermore, the interface of the power adapter includes at least one contact sheet 232 used to transfer charging current. The at least one first temperature measuring component corresponds to the at least one contact sheet separately and is configured to measure the temperature of the at least one contact sheet respectively. The determining unit 210 is further configured to determine the temperature of the charging interface according to the temperature of the at least one contact sheet.

In one implementation, each first temperature measuring component and a corresponding contact sheet thereof can be arranged on the same thermal conductive substrate; and there is a preset interval between each first temperature measuring component and the corresponding contact sheet. Optionally, the thermal conductive substrate is metallic.

In one implementation, an insulating thermal conductive layer is arranged between the first temperature measuring component and the thermal conductive substrate; or, the insulating thermal conductive layer is arranged between a corresponding contact sheet of the first temperature measuring component and the thermal conductive substrate.

In the following Examples, the charging control device can further include a receiving unit 242. The "receiving unit" referred to in the present disclosure can be a receiver.

Example 2

The charging interface includes the interface of the charging cable used for electrical connection with the power adapter.

Figure 3C:
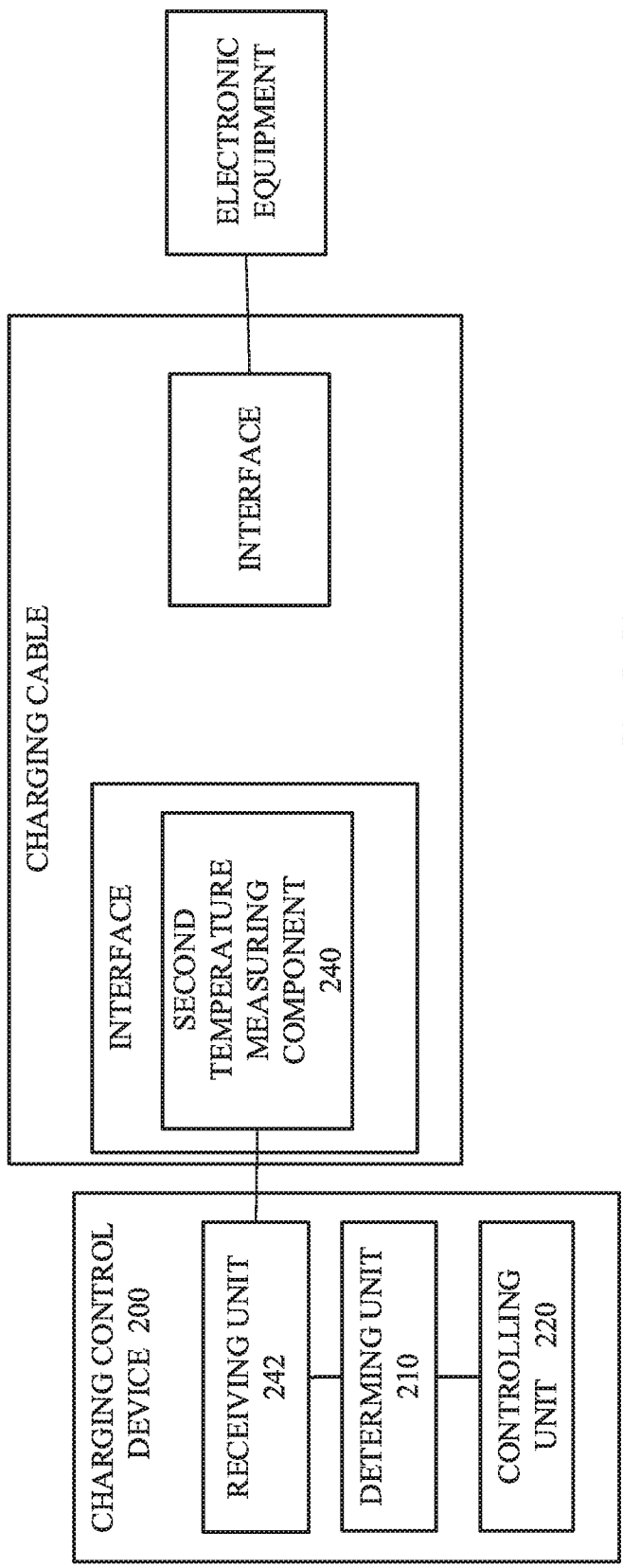

As shown in FIG. 3C, the receiving unit 242 is configured to receive first temperature indicating information transmitted from the charging cable, the first temperature indicating information is used to indicate the temperature of the charging interface measured by a second temperature measuring component 240 arranged in the interface of the charging cable used for electrical connection with the power adapter. The determining unit 210 is further configured to determine the temperature of the charging interface according to the first temperature indicating information received by the receiving unit 242.

Example 3

The charging interface includes the interface of the charging cable used for electrical connection with the electronic equipment.

Figure 3D:
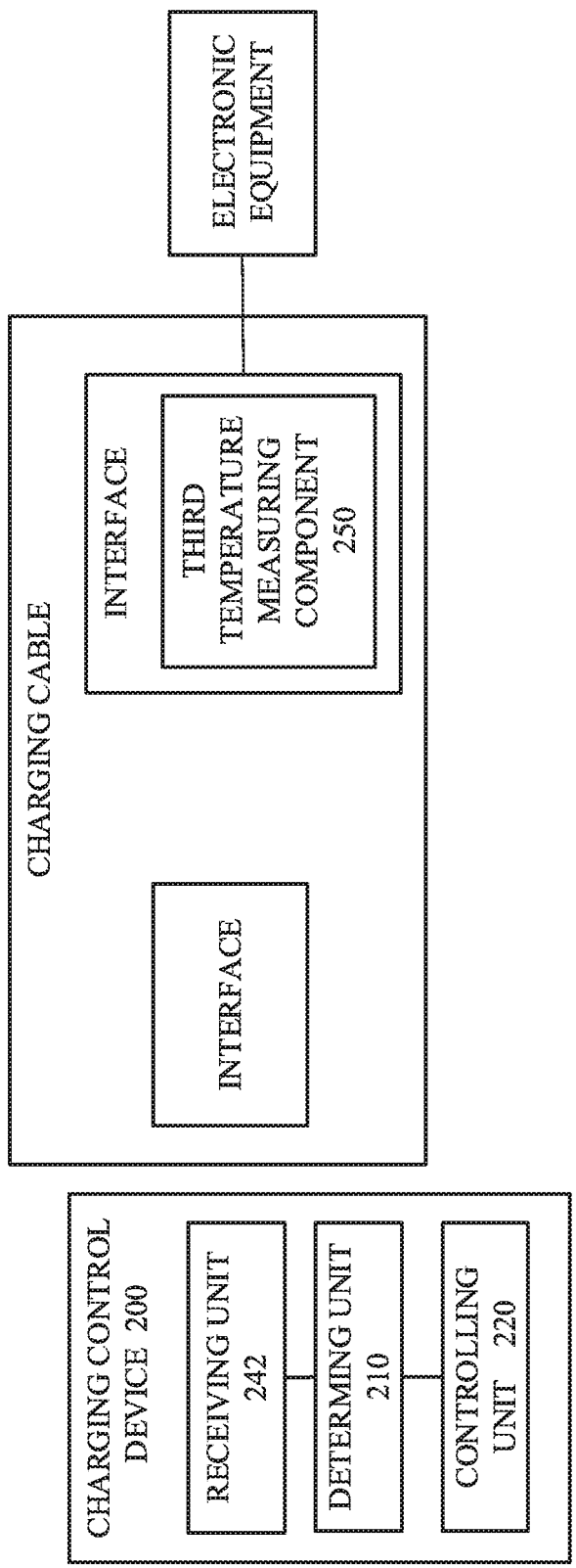

As shown in FIG. 3D, the receiving unit 242 is configured to receive second temperature indicating information transmitted from the charging cable; the second temperature indicating information is used to indicate the temperature of the charging interface measured by a third temperature measuring component 250 arranged in the interface of the charging cable used for electrical connection with the electronic equipment. The determining unit 210 is further configured to determine the temperature of the charging interface according to the second temperature indicating information received by the receiving unit 242.

Example 4

The charging interface includes the interface of the electronic equipment used for electrical connection with the charging cable.

Figure 3E:
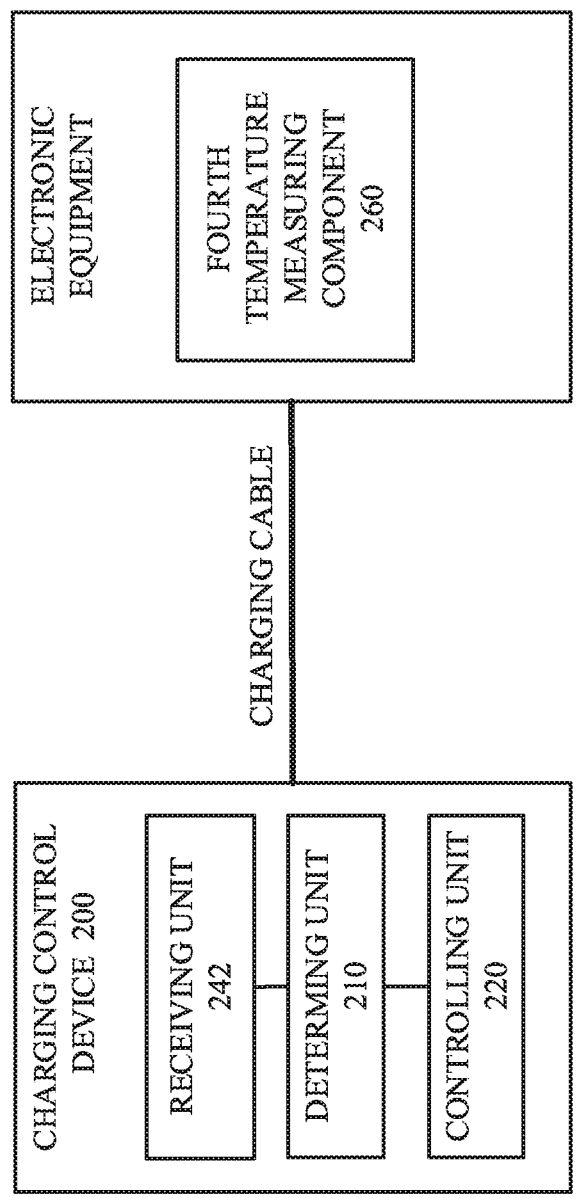

As shown in FIG. 3E, the receiving unit 242 is configured to receive third temperature indicating information transmitted from the electronic equipment via the charging cable; the third temperature indicating information is used to indicate the temperature of the charging interface measured by a fourth temperature measuring component 260 arranged in the interface of the electronic equipment used for electrical connection with the charging cable. The determining unit 210 is further configured to determine the temperature of the charging interface according to the third temperature indicating information received by the receiving unit 242.

In this example, the controlling unit 220 is configured to decrease the current value or voltage value of charging current if the temperature of the charging interface is greater than or equal to a first temperature threshold; or, configured to forbid the charging current to be output if the temperature of the charging interface is greater than or equal to a second temperature threshold; wherein the second temperature threshold is greater than the first temperature threshold.

In practice, the receiving unit used in Example 2~Example 4 can be realized through different components independent of each other respectively.

The charging control device 200 according to the implementation of the present disclosure corresponds to the implementing subject (such as the power adapter or functional components disposed in the power adapter) of the charging control method described above; in addition, respective unit or module and/or other operation or function of the charging control device 200 can achieve corresponding process of the charging control method as shown in FIG. 1, and will not go into much detail here.

By means of the charging control device, the temperature of the charging interface can be determined, and charging control can be performed according to the temperature of the charging interface, whereby components can be protected by adjusting charging current or charging voltage or even cutting off charging circuit, and safety of charging can be improved.

Implementation 3

Figure 4A:
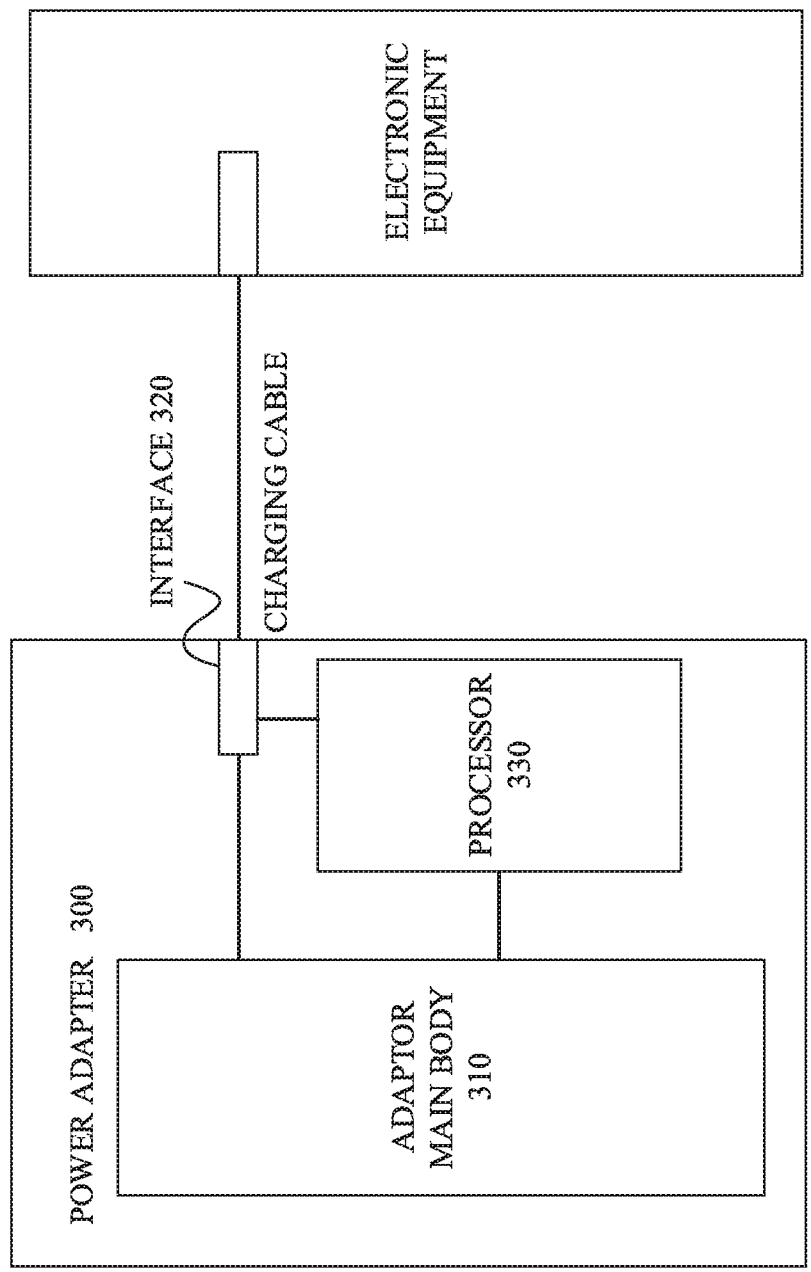
FIG. 4A is a schematic structure diagram illustrating a power adapter according to an implementation of the present disclosure.

According to implementation 3 of the present disclosure, it is provided a power adapter, and FIG. 4A is schematic structure diagram illustrating the power adapter. As shown in FIG. 4A, a power adapter 300 includes an adapter main body 310, an interface 320, and a processor 330.

Specifically, the adapter main body 310 is configured to obtain alternating current from a power supply and convert the alternating current to direct current with specified voltage. The interface 320 is configured to electronically connect to a charging cable, obtain the direct current from the adapter main body 310, and then provide the direct current to an electronic equipment through the charging cable. The processor 330 is configured to determine temperature of a charging interface, and control the adapter main body 310 or the interface 320 of the power adapter 300 according to the temperature of the charging interface so as to control the direct current provided to the electronic equipment.

The charging interface includes at least one of the following interfaces: the interface of the power adapter; an interface of the charging cable used for electrical connection with the power adapter; an interface of the charging cable used for electrical connection with the electronic equipment; and an interface of the electronic equipment used for electrical connection with the charging cable.

Example 1

The charging interface includes the interface of the power adapter.

Figure 4B:
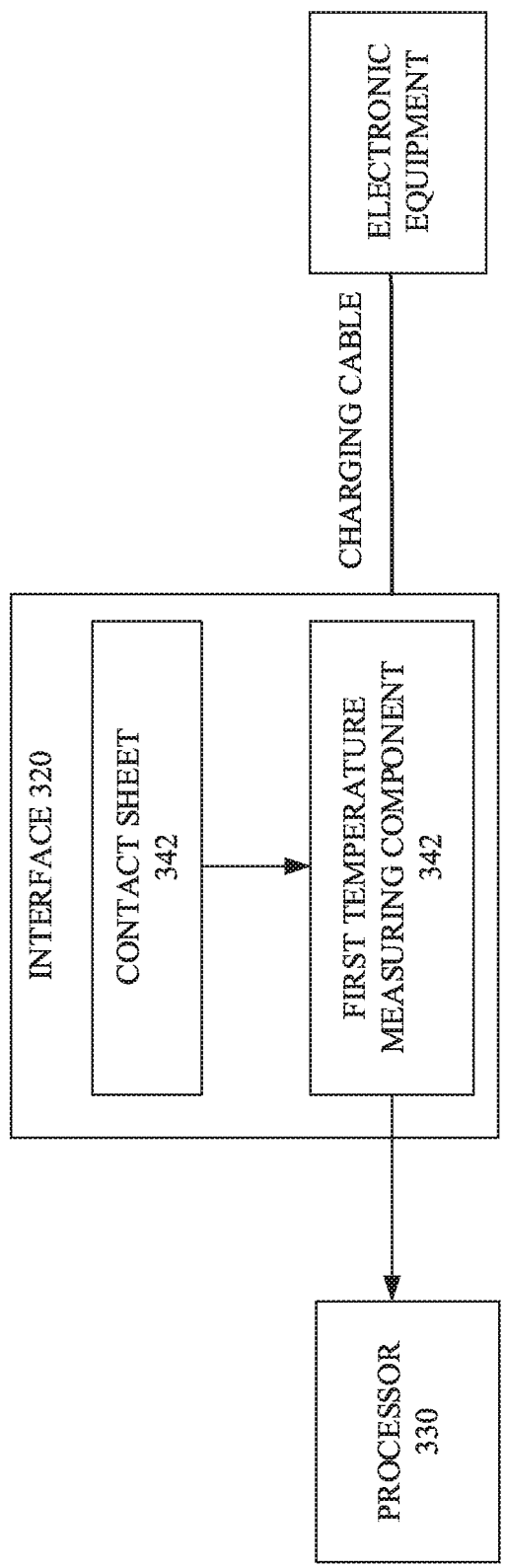
FIGS. 4B-4E are detailed schematic structure diagrams illustrating a power adapter according to implementations of the present disclosure.

As shown in FIG. 4B, the power adapter further includes: at least one first temperature measuring component 340, arranged in the interface 320 of the power adapter and configured to determine the temperature of the interface of the power adapter. The processor 330 is further configured to determine the temperature of the charging interface according to the temperature of the interface of the power adapter measured by the first temperature measuring component 340.

Optionally, as shown in FIG. 4B, the power adapter 300 further includes at least one contact sheet 342 arranged in the interface 320 of the power adapter and used to transfer charging current. The at least one first temperature measuring component corresponds to the at least one contact sheet separately, and each first temperature measuring component is configured to measure temperature of the at least one contact sheet respectively. The processor 330 is configured to determine the temperature of the charging interface according to the temperature of the at least one contact sheet.

In this example, each first temperature measuring component and a corresponding contact sheet thereof can be arranged on the same thermal conductive substrate; and there is a preset interval between each first temperature measuring component and the corresponding contact sheet. Optionally, the thermal conductive substrate is metallic.

Optionally, an insulating thermal conductive layer is arranged between the first temperature measuring component and the thermal conductive substrate; or, the insulating thermal conductive layer is arranged between a corresponding contact sheet of the first temperature measuring component and the thermal conductive substrate.

In the following examples, the power adapter further includes a receiver 352.

Example 2

The charging interface includes the interface of the charging cable used for electrical connection with the power adapter.

Figure 4C:
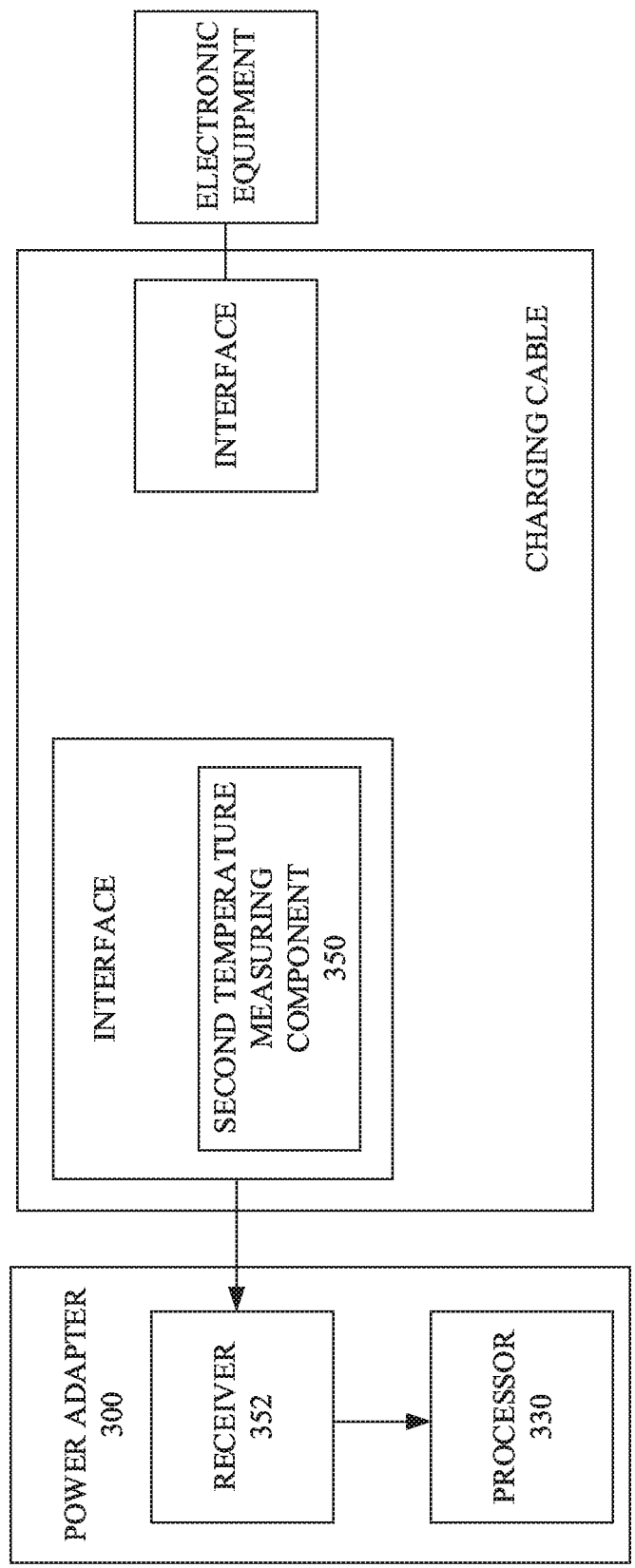

As shown in FIG. 4C, the receiver 352 is configured to receive first temperature indicating information transmitted from the charging cable. The first temperature indicating information is used to indicate the temperature of the charging cable measured by a second temperature measuring component 350 arranged in the interface of the charging cable used for electrical connection with the power adapter. The processor 330 is further configured to determine the temperature of the charging interface according to the first temperature indicating information received by the receiver 352.

Example 3

The charging interface includes the interface of the charging cable used for electrical connection with the electronic equipment.

Figure 4D:
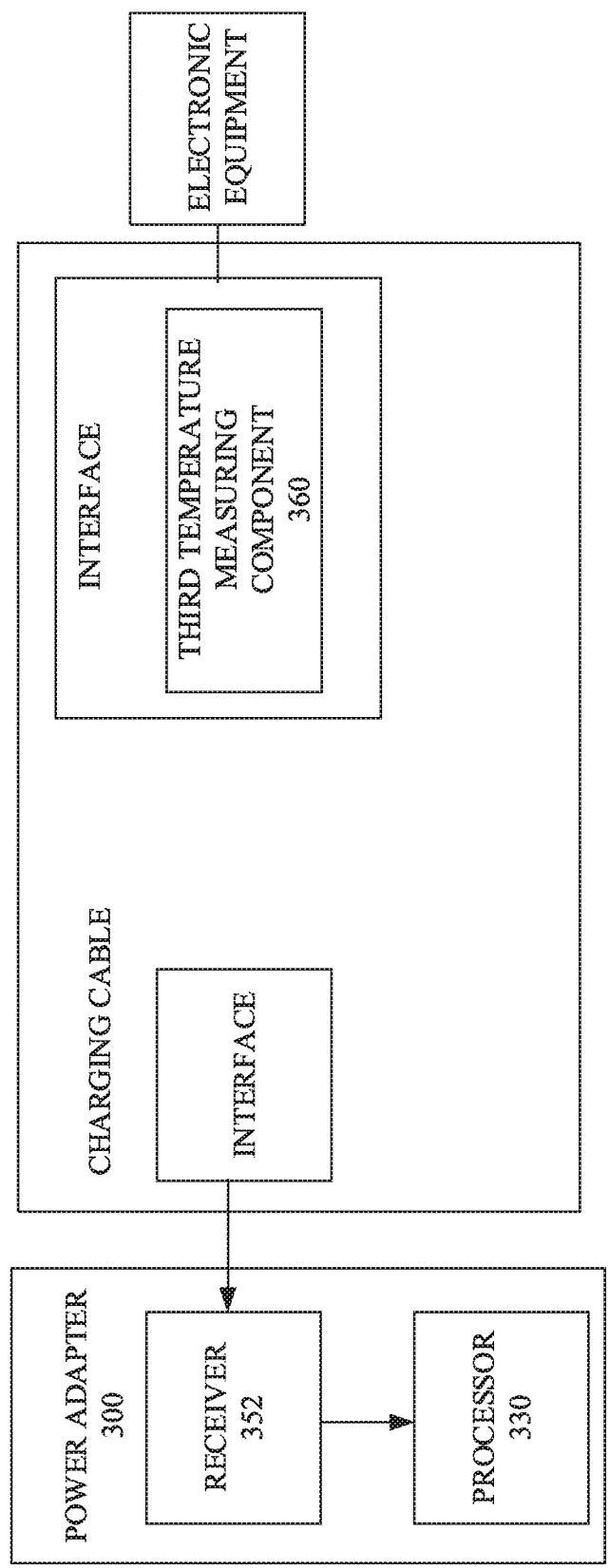

As shown in FIG. 4D, the receiver 352 is configured to receive second temperature indicating information transmitted from the charging cable. The second temperature indicating information is used to indicate the temperature of the charging interface measured by a third temperature measuring component 360 arranged in the interface of the charging cable used for electrical connection with the electronic equipment. The processor 330 is further configured to determine the temperature of the charging interface according to the second temperature indicating information.

Example 4

The charging interface includes the interface of the electronic equipment used for electrical connection with the charging cable.

Figure 4E:
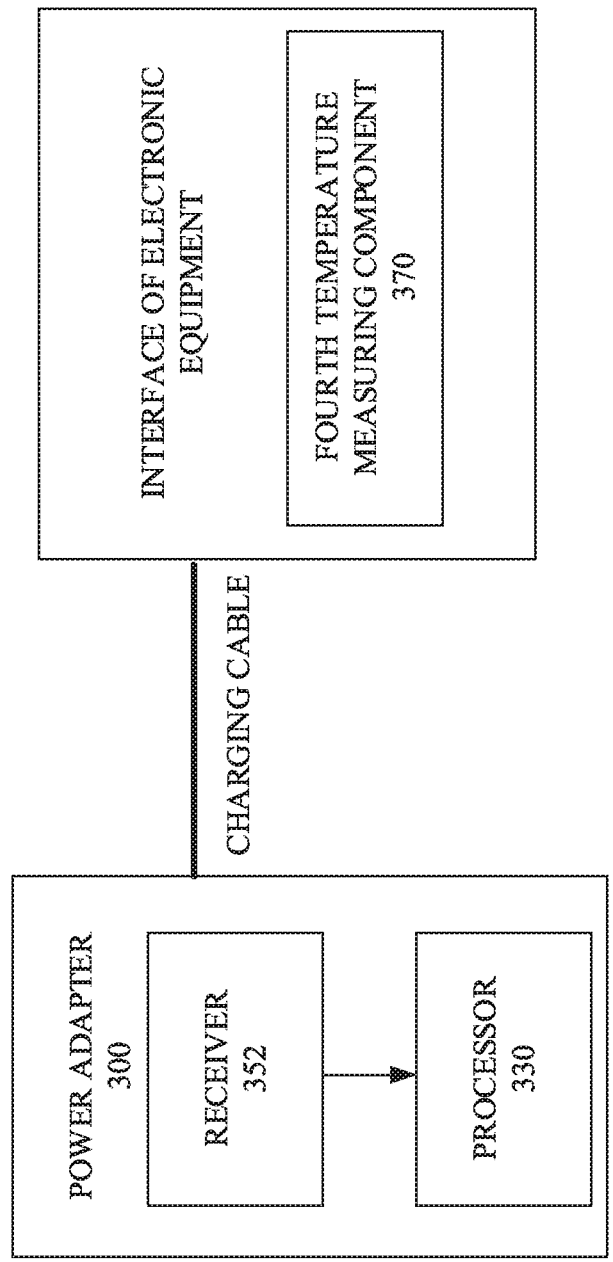

As shown in FIG. 4E, the receiver 352 is configured to receive third temperature indicating information transmitted from the electronic equipment via the charging cable. The third temperature indicating information is used to indicate the temperature of the charging interface measured by a fourth temperature measuring component 370 arranged in the interface of the electronic equipment used for electrical connection with the charging cable. The processor 330 is further configured to determine the temperature of the charging interface according to the third temperature indicating information.

The processor 330 is further configured to decrease the current value or voltage value of direct current if the temperature of the charging interface is greater than or equal to a first temperature threshold; or, configured to forbid the adapter main body to operate or forbid direct current to be output from the interface of the power adapter if the temperature of the charging interface is greater than or equal to a second temperature threshold; wherein the second temperature threshold is greater than the first temperature threshold.

In practice, the receiver in Example 2~Example 4 can be realized through different receivers independent of each other respectively.

Processor 330

In the following, the processor 330 will be described in detail.

The processor 330 can be CPU, general-purpose processor such as microprocessor, Digital signal processor (DSP), Special integrated circuit (ASIC), Field Programmable Gate Array (FPGA) or other programmable logic devices, discrete gate or transistor logic device, discrete hardware component, or, can be any other conventional processor or decoder.

Respective process of the charging control method according to the present disclosure or respective operation of the logic block diagram can be implemented or executed by a hardware processor, or by a combination of hardware and software module in a decoding processor; for example, it can be implemented by a integrated logic circuit of hardware or by instructions in the form of software in the processor.

The software module can be located in storage such as Read Only Memory (ROM), Random Access Memory (RAM), flash, programmable read-only memory or electrically erasable programmable memory, register, or any other known storage medium in the art. The storage is configured to provide instruction and data to the processor. The processor can read information from the storage, and then on the basis of the information, use hardware thereof to achieve the charging control method described above.

The charging control device 200 according to the implementation of the present disclosure can correspond to the implementing subject (such as the power adapter or functional components disposed in the power adapter) of the charging control method described above; in addition, respective unit or module and/or other operation or function of the charging control device 200 can achieve corresponding process of the charging control method as shown in FIG. 1, and will not go into much detail here.

The power adapter 300 according to the implementation of the present disclosure can correspond to the implementing subject of the charging control method described above either; in addition, respective unit or module and/or other operation or function of the power adapter 300 can achieve corresponding process of the charging control method as shown in FIG. 1, and will not go into much detail here.

By means of the power adapter according to the implementation of the present disclosure, the temperature of the charging interface can be measured, and charging control can be performed based on the temperature; whereby components can be protected through adjusting charging current/voltage or even cutting off charging circuits if the temperature of the charging interface is greater than a safe temperature, and the security of charging can be improved.

In the implementations described above, the order of execution of operations or steps should be determined based on function and internal logic, and the order of description should not be construed as a restriction on the order of execution.

A person skilled in the art will understand, exemplary units or algorithm steps described in any of the implementations can be achieved via electronic hardware or a combination of electronic hardware and computer software. Whether hardware or software should be adopted depends on design constraints and specific application of technical schemes. Respective specific application can use different methods or manners to achieve the function described in the implementations, which will fall into the protection scope of the present disclosure.

Specific operations of the device, system such as the power adapter, and the unit or module can refer to corresponding description of the charging control method according to the implementation. Besides, the device, system, and method described herein can be achieved in other ways. Configuration of the device according to the implementation described above is only exemplary; division of units in the device is a kind of division according to logical function, therefore there can be other divisions in practice. For example, multiple units or components can be combined or integrated into another system; or, some features can be ignored while some units need not to be executed. On the other hand, various function units can integrated into one processing unit; two or more than two units can integrated into one unit; or, each unit is physically separate.

In addition, "connection", "connecting", "coupling", or "coupled to" can be direct connection or communication connection via one or more interface; or, can be electrical or mechanical indirect connection via one or more intermediate part.

On the other hand, units or components illustrated as separated components can be physically separate, components illustrated as units can be physical units, that is, they can be located in one place, or can be dispersed in multiple network units or systems. All or a part of the units or components illustrated above can be chosen to achieve the purpose of the present disclosure.

Operations or functions of technical schemes according to implementations of the present disclosure, which are achieved in the form of software functional units and can be sold or used as an independent product, can be stored in computer readable storage medium. According to this, all or a part of the technical schemes of the present disclosure can be realized in the form of software products which can be stored in a storage medium. The storage medium includes USB disk, Read Only Memory (ROM), Random Access Memory (RAM), magnetic disk, CD, and any other medium that can be configured to store computer-readable program code or instructions. The computer-readable program code, when executed on a data-processing apparatus (can be personal computer, server, or network equipment), adapted to perform the all or a part of the methods as described in the above-mentioned implementations.

The foregoing descriptions are merely exemplary implementations of the present disclosure, and should not be interpreted as any restriction. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for charging control of a power adapter configured to charge an electronic equipment through a charging cable, comprising:
   determining temperature of a charging interface; and
   controlling charging for the electronic equipment according to the temperature of the charging interface, wherein the charging interface comprising at least one of the following interfaces: an interface of the power adapter used for electrical connection with the charging cable, an interface of the charging cable used for electrical connection with the power adapter, an interface of the charging cable used for electrical connection with the electronic equipment, and an interface of the electronic equipment used for electrical connection with the charging cable, wherein the interface of the power adapter has at least one first temperature measuring component and at least one contact sheet, each of the at least one first temperature measuring component is configured to measure temperature of a corresponding contact sheet in the at least one contact sheet, and each of the at least one first temperature measuring component and the corresponding contact sheet are arranged on the same thermal conductive substrate; and wherein
   each of the at least one first temperature measuring component and the corresponding contact sheet are spaced apart with a preset interval; and
   an insulating thermal conductive layer is arranged between the first temperature measuring component and the thermal conductive substrate; or, the insulating thermal conductive layer is arranged between the corresponding contact sheet of the first temperature measuring component and the thermal conductive substrate.

2. The method of claim 1, wherein the charging interface comprises the interface of the power adapter used for electrical connection with the charging cable and determining the temperature of the charging interface comprises:
   determining the temperature of the charging interface through the at least one first temperature measuring component arranged in the interface of the power adapter.

3. The method of claim 2, wherein determining the temperature of the charging interface through the at least one first temperature measuring component comprises:
   measuring temperature of at least one contact sheet arranged in the interface of the power adapter through at least one first temperature measuring component; and
   determining the temperature of the charging interface according to the temperature of the at least one contact sheet, the at least one contact sheet being used to transfer charging current.

4. The method of claim 1, wherein determining the temperature of the charging interface comprises:
   receiving temperature indicating information; and
   determining the temperature of the charging interface according to the temperature indicating information, wherein
   the temperature indicating information is first temperature indicating information, which is transmitted from the charging cable and used to indicate the temperature of the charging interface measured by a second temperature measuring component arranged in the interface of the charging cable for electrical connection with the power adapter, when the charging interface comprises the interface of the charging cable used for electrical connection with the power adapter;
   the temperature indicating information is second temperature indicating information, which is transmitted from the charging cable and used to indicate the temperature of the charging interface measured through a third temperature measuring component arranged in the interface of the charging cable used for electrical connection with the electronic equipment, when the charging interface comprises the interface of the charging cable used for electrical connection with the electronic equipment; or
   the temperature indicating information is third temperature indicating information, which is transmitted from the electronic equipment via the charging cable and used to indicate the temperature of the charging interface measured through a fourth temperature measuring component arranged in the interface of the electronic equipment used for electrical connection with the charging cable, when the charging interface comprises the interface of the electronic equipment used for electrical connection with the charging cable.

5. The method of claim 1, wherein controlling charging for the electronic equipment according to the temperature of the charging interface comprises:
   decreasing current value or voltage value of charging current when the temperature of the charging interface is greater than or equal to a first temperature threshold; or
   forbidding the charging current to be outputted when the temperature of the charging interface is greater than or equal to a second temperature threshold, wherein the second temperature threshold is greater than the first temperature threshold.

6. A device for charging control of a power adapter used for charging of an electronic equipment through a charging cable, comprising:
   a determining unit, configured to determine temperature of a charging interface; and
   a controlling unit, configured to control charging for the electronic equipment according to the temperature of the charging interface, the charging interface comprising at least one of the following interfaces: an interface of the power adapter used for electrical connection with the charging cable, an interface of the charging cable used for electrical connection with the power adapter, an interface of the charging cable used for electrical connection with the electronic equipment, and an interface of the electronic equipment used for electrical connection with the charging cable, wherein the interface of the power adapter has at least one first temperature measuring component and at least one contact sheet, each of the at least one first temperature measuring component is configured to measure temperature of a corresponding contact sheet in the at least one contact sheet, and each of the at least one first temperature measuring component and the corresponding contact sheet are arranged on the same thermal conductive substrate; and wherein each of the at least one first temperature measuring component and the corresponding contact sheet are spaced apart with a preset interval; and an insulating thermal conductive layer is arranged between the first temperature measuring component and the thermal conductive substrate; or the insulating thermal conductive layer is arranged between the corresponding contact sheet of the first temperature measuring component and the thermal conductive substrate.

7. The device of claim 6, wherein the charging interface comprises the interface of the power adapter used for electrical connection with the charging cable;

the determining unit is configured to determine the temperature of the charging interface through the at least one first temperature measuring component.

8. The device of claim 7, wherein the charging control device further comprises at least one contact sheet which is configured to transmit charging current and is arranged in the interface of the power adapter being used for electrical connection with the charging cable;

each of the at least one first temperature measuring component is configured to measure the temperature of the corresponding contact sheet; and the determining unit is configured to determine the temperature of the charging interface according to the temperature of the at least one contact sheet.

9. The device of claim 6, wherein the charging control device further comprises:

a receiving unit, configured to receive temperature indicating information transmitted from the charging cable; and the determining unit is configured to determine the temperature of the charging interface according to the temperature indicating information, wherein the temperature indicating information is first temperature indicating information, which is transmitted from the charging cable and used to indicate the temperature of the charging interface measured by a second temperature measuring component arranged in the interface of the charging cable for electrical connection with the power adapter, when the charging interface comprises the interface of the charging cable used for electrical connection with the power adapter;

the temperature indicating information is second temperature indicating information, which is transmitted from the charging cable and used to indicate the temperature of the charging interface measured by a third temperature measuring component arranged in the interface of the charging cable used for electrical connection with the electronic equipment, when the charging interface comprises the interface of the charging cable used for electrical connection with the electronic equipment; or the temperature indicating information is third temperature indicating information, which is transmitted from the electronic equipment via the charging cable and used to indicate the temperature of the charging interface measured by a fourth temperature measuring component arranged in the interface of the electronic equipment used for electrical connection with the charging cable, when the charging interface comprises the interface of the electronic equipment used for electrical connection with the charging cable.

10. The device of claim 6, wherein the controlling unit is configured to decrease current value or voltage value of charging current when the temperature of the charging interface is greater than or equal to a first temperature threshold; or forbid the charging current to be outputted when the temperature of the charging interface is greater than or equal to a second temperature threshold.

* * * * *